H. MIKOREY.
INDICATOR FOR TESTING LIQUIDS WITH RESPECT TO VISCOSITY.
APPLICATION FILED MAR. 16, 1906.
920,604.
Patented May 4, 1909.
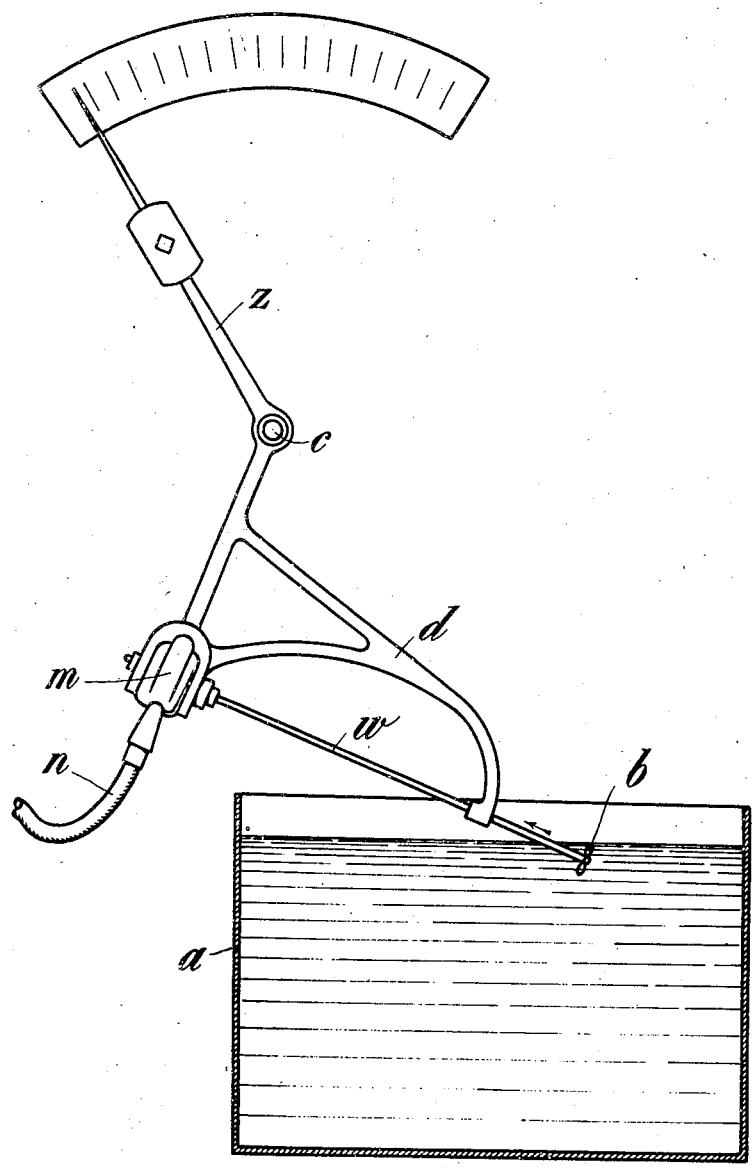

UNITED STATES PATENT OFFICE.

HANS MIKOREY, OF SCHÖNEBERG, GERMANY, ASSIGNOR TO THE FIRM OF W. GRAAFF & COMPAGNIE, GES. MIT BESCHR. HAFTUNG, OF BERLIN, GERMANY.

INDICATOR FOR TESTING LIQUIDS WITH RESPECT TO VISCOSITY.

No. 920,604.          Specification of Letters Patent.          Patented May 4, 1909.

Application filed March 16, 1906. Serial No. 306,412.

*To all whom it may concern:*

Be it known that I, HANS MIKOREY, a civil engineer, and a subject of the German Emperor, residing at 13 Wartburgstrasse, in the city of Schöneberg, near Berlin, Kingdom of Prussia and German Empire, have invented a certain new and useful Indicator for Testing Liquids with Respect to Viscosity, of which the following is a specification.

This invention has reference to a method and to a device for making determinations of viscosity and for the testing of liquids and in particular of lubricating oils. In order to test lubricating materials, such as oils and the like, for viscosity and slippery condition, the present invention makes use of the power of a propeller screw operating within a liquid with a certain rate of driving power as a standard base for comparison and for the purpose of producing an indicating movement. The propeller screw is movably mounted beneath the level of the liquid and in such a manner, as to allow of its being screwed forward up to a certain limit and against the action of a given resistance or load, until the slip is compensated by the driving power of the propeller. From the rate of movement, which may be read off on a scale or indicating device, it is possible to estimate the degree of viscosity and slipperiness of the liquid under consideration as compared with another liquid, even very delicate differences in quality being made conspicuous.

The method may be carried out by the aid of a device which is represented by way of example.

In the drawing $a$ designates the receptacle or container for the liquid, which is filled up to a certain level with the liquid to be tested. Within this receptacle a propeller screw $b$ operates, the shaft $w$ of which is journaled in a movable frame $d$. The said frame, upon which the driving motor engine $m$ is also mounted, can be swung around the pivot $c$ and is provided with a pointer $z$ moving upon a scale $s$ and having the tendency to assume a certain initial position in consequence of the distribution of weight and of the mounting of the frame. The motor engine $m$ is represented as a small compressed air turbine, while the compressed air for the operation of the turbine may be admitted by a movable flexible tube conduit $n$. Provision has to be made for a uniform and if possible controllable driving of the motor.

When the motor engine $m$ is started and causes the propeller shaft $w$ to rotate with a certain speed, the propeller screw $b$ generates a driving power, which tends to cause a swinging of the frame $d$ in the direction indicated by the arrow. According to the viscosity and to the degree of slippery condition of the liquid the condition of equilibrium will be obtained after a limit of movement corresponding to a smaller or larger arc of movement of the pointer, at which limit the slip resulting from the resistance of the counter weight will balance the action of the driving power of the propeller. The resistance is determined by the one-sided action of the load upon the frame which is pivoted at $c$; spring action may also be used as a counter force.

By comparing the arcs upon the scale $s$ through which the pointer moves and which are obtained by applying the said testing method upon different liquids or upon the liquid to be tested under different conditions, the relative degree of viscosity and of slipperiness of every liquid can be determined. The method permits a very nice and delicate distinction of liquids, however similar their other qualities may be, and this fact is valued as an advantage, in particular in making comparative tests of samples of lubricating oils.

What I claim and desire to secure by Letters Patent of the United States is:—

1. Indicator for testing liquids with respect to viscosity comprising a fulcrumed lever, an indicator or hand forming one arm of said lever to act on a graduated scale, a scale concentric to the fulcrum of the lever, a propeller screw having its shaft suitably journaled in the other arm of said lever, adapted to revolve in the liquid to be tested, and a motor of approximately constant driving power to turn the propeller in the liquid, substantially as described.

2. Indicator for testing liquids with respect to viscosity comprising a double armed lever, an indicator or hand forming one arm of said lever, adapted to act on a graduated scale, a scale concentric to the fulcrum of the lever, a frame secured to the other arm of said lever, a shaft journaled in said frame, a propeller screw secured to one end of the shaft and adapted to revolve in the liquid to be tested, a motor of approximately constant driving power secured to the other end of said shaft to turn the propeller screw, substantially as described.

In witness whereof I have hereunto signed my name this third day of March 1906, in the presence of two subscribing witnesses.

HANS MIKOREY.

Witnesses:
    HENRY HASPER,
    WOLDEMAR HAUPT.